W. HOSKINS.
RESILIENT BODY.
APPLICATION FILED MAY 19, 1913.

1,155,575.

Patented Oct. 5, 1915.

Witnesses:

Inventor.
William Hoskins,
By Dyrenforth, Lee, Chritton & Wiles,
Attys.

UNITED STATES PATENT OFFICE.

WILLIAM HOSKINS, OF LA GRANGE, ILLINOIS.

RESILIENT BODY.

1,155,575.                Specification of Letters Patent.          Patented Oct. 5, 1915.

Application filed May 19, 1913. Serial No. 768,578.

*To all whom it may concern:*

Be it known that I, WILLIAM HOSKINS, a citizen of the United States, residing at La Grange, in the county of Cook and State of Illinois, have invented a new and useful Improvement in Resilient Bodies, of which the following is a specification.

My invention relates to resilient bodies, such as for example, playing-balls, buffers, tires and other bodies, commonly made of rubber; and my object is to so construct such articles that they will possess a high degree of resiliency and may be manufactured at relatively low cost.

Figure 1:
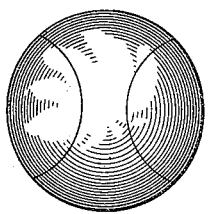
Figure 2:
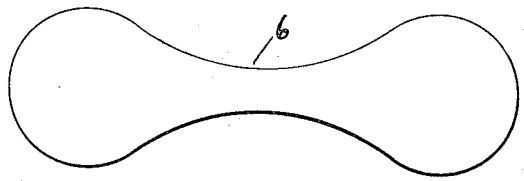
Figure 3:
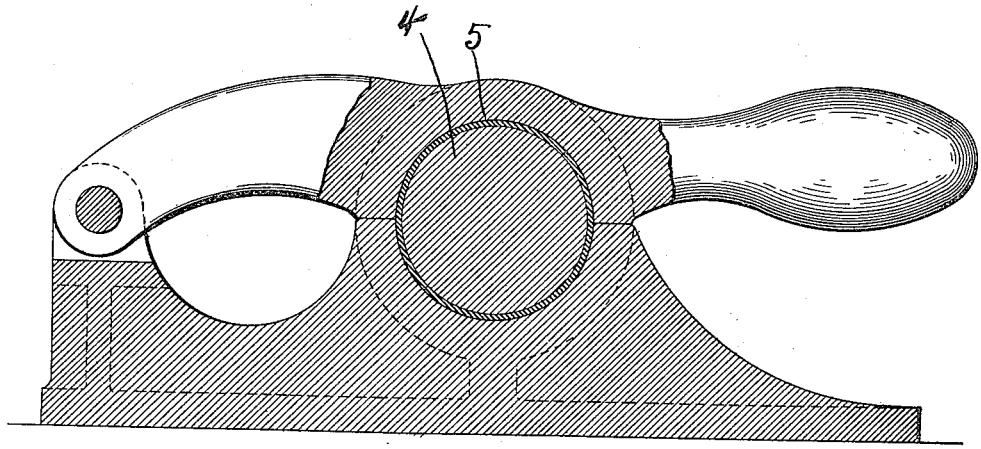

Referring to the accompanying drawing—Figure 1 shows a resilient body constructed in accordance with my invention, the body shown and selected for illustrating my invention being a playing-ball. Fig. 2 is a plan view of one of the similar rubber cover sections forming the outside surface of the ball; and Fig. 3, a view in sectional elevation of a mold which may be used in forming the ball of the preceding figures, a ball being shown therein in section.

Generally stated, my invention consists in forming the resilient body of an inner mass of rubber substitute of any desirable character molded into the same, or approximately the same, shape as the finished article to be produced, and an outer relatively thin section or envelop of rubber, which hermetically seals the inclosed mass of substitute rubber and thus preserves it against deterioration.

The playing-ball illustrated in Fig. 1 is formed of a core or section 4 of any suitable rubber substitute, and in accordance with my invention, molded in any suitable manner into spherical form, and an outer section or envelop 5 of rubber entirely surrounding the core 4 and hermetically sealing the latter. The core 4, as above stated, may be formed of any suitable rubber substitute, that preferred being composed of glue, water, glycerin and potassium chromate, in the following proportions: 36 per cent. glue, 33 per cent. water, 30 per cent. glycerin and 1 per cent. potassium chromate, the glue being first dissolved in the water, the glycerin in warm condition then added to the glue solution, and the potassium chromate thereupon added to the glycerin-glue solution, the mass thus produced then being immediately molded to form the core to be produced.

The cover section 5, in accordance with the illustrated embodiment of my invention, is formed of sheets of uncured rubber prepared for vulcanization and preferably of such shape as to cause them to completely cover the core, these sheets being illustrated at 6 and so shaped as illustrated as to interfit with each other when wrapped about the core. The core 4 with the sheets 6 thus applied is then placed in any suitable mold, as for example, that illustrated in Fig. 3 and the mass then subjected to vulcanizing heat, which causes the covering 5 to become vulcanized, the adjacent edges of the sheets 6 uniting and thus producing a covering for the core which hermetically seals the latter against access of moisture thereto and vaporization of its moisture-content. The subjection of the mass described to vulcanizing heat also causes the covering 5 to adhere to the core 4 and thus the covering is firmly held in place.

A mass of substitute rubber, so long as its volatile content is retained, presents a high degree of resiliency, equaling, if not exceeding, that of soft rubber, and in constructing a resilient body in accordance with my invention, I avail myself of this property of the rubber substitute and provide the covering 5 primarily as a mere protecting envelop to prevent the access of moisture and air to the core and the escape of volatile constituents from the latter, thus causing the core to retain its resiliency. It will thus be understood that the covering need be only relatively thin, under ordinary conditions a covering of one-sixteenth of an inch in thickness being sufficient, and that it is immaterial what method is followed in producing the covering 6. The method just described is desirable, but it is manifest that the core may be provided with the desired covering by any other suitable method, such as for example, by applying to the core a liquid solution of uncured rubber prepared for vulcanization, such, for instance, a bisulfid of carbon solution, and thereupon subjecting the mass thus produced to vulcanizing heat.

While I have illustrated and described my invention as applied to a playing-ball, I do not wish to be understood as intending to limit it to such an article as it may be provided in various other shapes depending upon the use to which it is to be put.

What I claim as new and desire to secure by Letters Patent is—

5 A new article of manufacture comprising a core formed of a resilient rubber-substitute, and a relatively thin imperforate covering of soft rubber surrounding and bonded to said core.

WILLIAM HOSKINS.

In presence of—
A. C. FISCHER,
O. C. AVISUS.